Oct. 3, 1961   C. L. COCHRAN   3,002,709
AIRCRAFT ADAPTED FOR VERTICAL ASCENT AND DESCENT
Filed Dec. 19, 1955   2 Sheets-Sheet 1

INVENTOR.
Charles L. Cochran
BY
ATTORNEY.

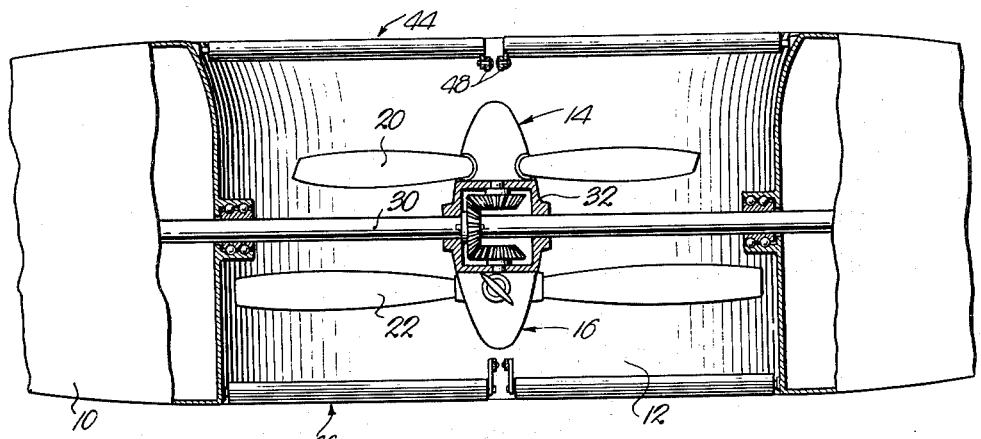
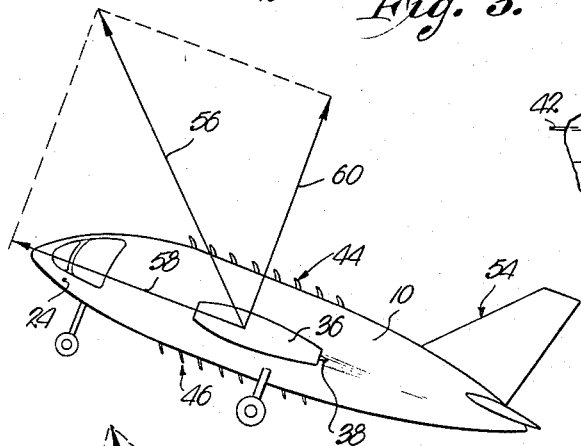
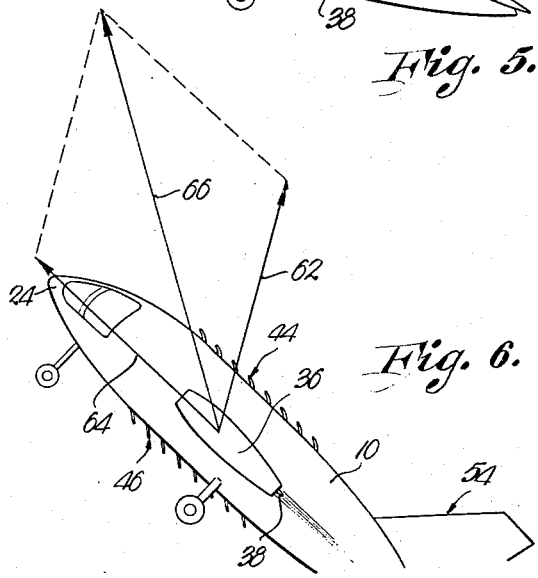

(#) 3,002,709
AIRCRAFT ADAPTED FOR VERTICAL ASCENT AND DESCENT

Charles L. Cochran, Overland Park, Kans., assignor to C. L. Cochran and Associates, Overland Park, Kans., a copartnership composed of Charles L. Cochran, Norman E. Schaeffer, Earl Lindsly, Vernon L. Hurst, and Donald A. Lueke
Filed Dec. 19, 1955, Ser. No. 553,808
2 Claims. (Cl. 244—12)

This invention relates to the field of aerodynamics and more particularly to novel aircraft design which combines the advantages of standard fixed wing aircraft with rotary wing aircraft to permit normal take-off and landing procedures, as well as vertical ascent and descent as conditions may require or as the pilot may desire.

It is the primary object of the present invention to provide a convertible, heavier-than-aircraft incorporating in the design thereof features for permitting a high rate of forward speed notwithstanding the fact that there is included rotary wing means for lift purposes.

It is the most important object of the present invention to correlate the vertical thrust produced by rotatable airfoils with forward thrust provided by separate power means in a manner to advantageously utilize both forces simultaneously, rendering the airplane highly maneuverable forwardly or rearwardly during ascent or descent.

Another important object of the instant invention is to provide a convertible airplane having a fuselage provided with an aerodynamic configuration, together with rotary wing means much in the nature of helicopter design but housed entirely within the fuselage whereby to eliminate drag and permit high forward speed when the rotary wing means is not in operation and when sustention is secured from forward motion independently of the rotatable airfoils and by virtue of the airfoil surfaces of the fuselage or airplane body itself.

A further object of this invention is to provide rotary wing aircraft of the aforementioned character powered through the medium of jet engines whereby additional forward thrust is attained through jet exhaust emanating from said engines.

A still further object of this invention is to provide a convertible airplane having rotor blades, together with jet engines for forward thrust disposed in opposed relationship to permit controlling movement of the plane on its vertical axis and, therefore, control direction of flight.

It is another object of the present invention to provide an airplane having counter-rotating airfoils, each provided with variable pitch rotor blades to not only control torque, but to provide sufficient lift at the proper location in the rotor discs to produce motion in the desired direction and to drive the rotors in opposite directions by opposed turbo-propeller engines, each operably coupled with the rotors.

Another important object of the instant invention is to provide an airplane having opposed turbo-propeller engines for driving the rotor blades as aforementioned, as well as opposed jet propulsion means to produce forward thrust, all to the end that stability may be provided through employment of a control surface for each engine respectively in the nature of a deflector for exhaust gases whereby to control pitch and roll.

Another object of the instant invention is to provide an air duct for flow of air created by the rotating airfoils and within which the latter are mounted, the air duct in turn being provided with auxiliary lift devices, as well as means for correlating forward and vertical thrust and taking the form of shutter means capable of completing the aerodynamic configuration of the fuselage when the shutters are closed during forward flight and while the rotary airfoils are inoperative and completely housed within the air duct.

In the drawings:

FIG. 3 is a fragmentary, cross-sectional view taken on line III—III of FIG. 2.

FIG. 4 is a fragmentary, side elevational view showing one of the jet engines and particularly its control surface for deflecting the exhaust gases emanating therefrom.

FIG. 5 is a side elevational view on a reduced scale illustrating diagrammatically the resultant forces during take-off and landing; and FIG. 6 is a view similar to FIG. 5 illustrating the attitude of the plane and its direction of travel when the forces of the counter rotating propellers and the turbojets are brought more closely together to provide a greater resultant force.

Figure 1:
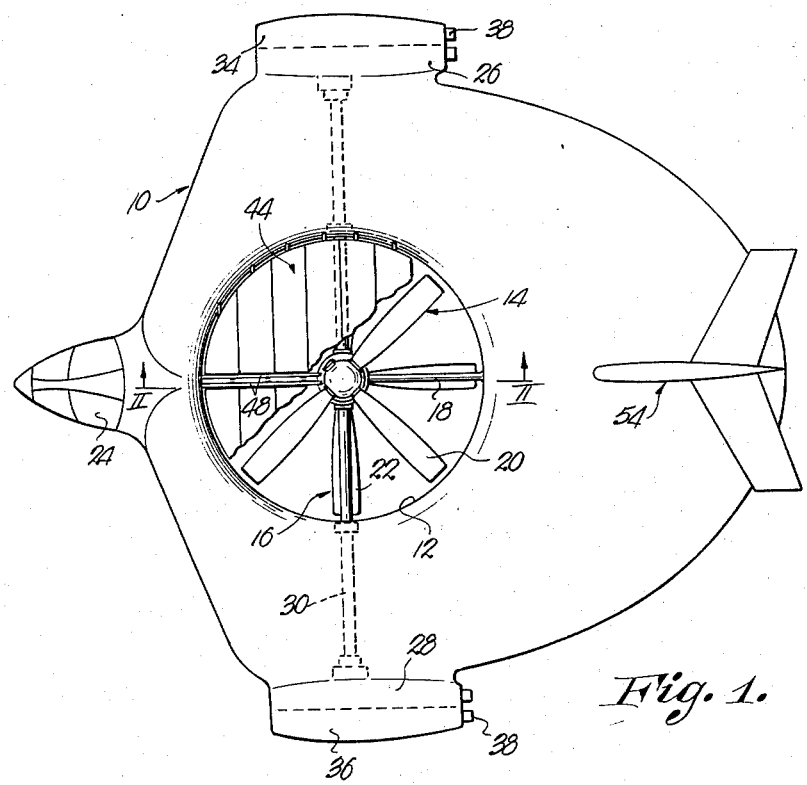
FIGURE 1 is a top plan view of an aircraft adapted for vertical ascent and descent made pursuant to my present invention.

As hereinabove indicated, the design of the convertible aircraft illustrated in the drawings and about to be described, is such as to incorporate the lifting capabilities of rotary airfoils in a manner similar to conventional helicopters while at the same time providing for a higher rate of forward speed. Manifestly, helicopter design does not permit high forward speed and, therefore, many attempts have been made to provide structure for satisfactorily converting the craft from one capable of vertical ascent and descent to standard principles of fast forward motion. More particularly, the problem is met by bringing together or correlating forward and vertical thrusts whereby lift is attained as a result of such forces other than independently and solely by virtue of the effects of the rotating airfoils as has heretofore been true in previous attempts toward convertible aircraft.

Referring now more particularly to the drawings, and as best seen in FIG. 1 thereof, there is provided a body or fuselage broadly designated by the numeral 10 and which is wingless except only for rotatable airfoils housed therewithin. Inasmuch as it is necessary to secure sustention from forward motion independently of the rotatable airfoils in accordance with the principles of the instant invention, the fuselage 10 should have an aerodynamic configuration, and since such airfoil surfaces are quite conventional and well understood, further detailed explanation thereof is unnecessary.

An air duct in the nature of a vertical tube 12 forming a part of the fuselage 10, should be properly shaped to attain the best advantage so far as lift is concerned from flow of air therethrough as created and motivated by the rotary airfoils mounted therewithin. Such airfoils are in the nature of a pair of contra-rotating propellers 14 and 16 suitably secured to the tube 12 therewithin by use of diametrical structure supports 18.

Propellers 14 and 16 are provided with variable pitch rotor blades 20 and 22 respectively, and such pitch may be controlled automatically or by the pilot from cockpit 24 through use of any standard flight controls operably coupled therewith but not illustrated in the drawings. Manifestly, such pitch control provides sufficient lift at the proper location in the corresponding rotary wings or air foils 14 and 16 to produce motion in the desired direction.

Propellers 14 and 16 are preferably mounted for rotation on a common vertical axis and may be driven in any suitable manner. There are many advantages however, to the provision of jet engine power means therefor and, to this end, opposed turbo-propulsion engines 26 and 28 for propellers 14 and 16 respectively, are mounted on the fuselage 10 exteriorly thereof. Shaft 30 driven by the engines 26 and 28 may be coupled with the propellers 14 and 16 through suitable gearing within gear box 32 as seen best in FIG. 3 of the drawings.

Forward thrust is likewise preferably attained through use of jet propulsion means disposed in a balanced arrangement and to this end there is provided turbojet engines 34 and 36 adjacent the engines 26 and 28 respectively. Manifestly, flight control, particularly movement about a vertical axis for determining direction of flight, is dependent primarily upon the engines 34 and 36 since the relative power-producing characteristics thereof are under the direct control of the pilot.

Stability is attained through utilization of control surfaces in the nature of a deflector 38 for each engine 26, 28, 34 and 36 respectively, and disposed within exhaust nozzles thereof for swinging movement about horizontal axes 40. The control surfaces 38 may be actuated through any suitable flight control mechanism emanating from the cockpit 24 and, to this end, there is illustrated a cable or the like 42 operably coupled with each deflector 38 in the manner seen in FIG. 4 of the drawings.

It is clear at this point that both pitch and roll may be controlled by use of the deflectors 38 to directionalize the flow of exhaust gases emanating from the jet engines whereby to provide the aforementioned stability. In other words, the deflectors 38 are all moved in the same direction for pitch control in a manner similar to conventional control of elevators in conventional aircraft. Roll is controlled by deflecting the control surfaces 38 for engines 28 and 36 in one direction while deflecting the surfaces 38 for engines 26 and 34 in the opposite direction as in the case of ailerons in conventional craft.

The air duct 12 should be closed during normal flight when the propellers 14 and 16 are shut down and, to this end, there is provided uppermost and lowermost shutters broadly designated by the numerals 44 and 46 respectively and designed, when closed, to complete the airfoil surfaces or aerodynamic configuration of the fuselage 10. The shutters 44 and 46 should, however, be chosen so far as shape and disposition is concerned, to add to the lift characteristics of the aircraft and to this end, it is seen that each of the shutters 44 is provided with an airfoil shape to create an added lift when the same are opened to the positions shown in FIGS. 5 and 6 of the drawings.

Figure 2:
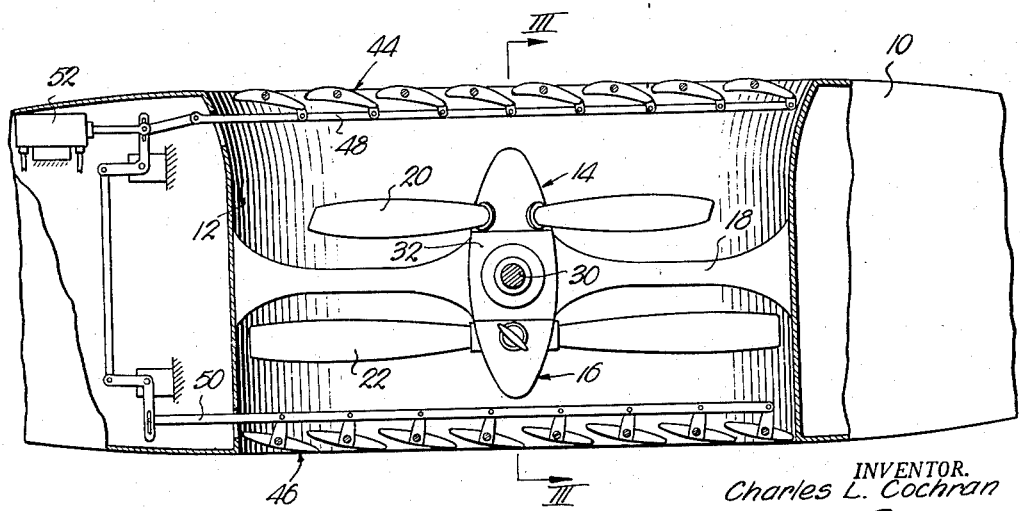
FIG. 2 is an enlarged, fragmentary, cross-sectional view taken on line II—II of FIG. 1.

Similarly, the shutters 46 are movable from the closed position shown in FIG. 2 to the positions illustrated in FIGS. 5 and 6 of the drawings whereby to deflect the air mass flowing through the duct 12 both rearwardly and downwardly to more closely bring the force of the turbojets 26 and 28 and the force of the propellers 14 and 16, together, thereby providing a greater resultant force as shown in FIG. 6 of the drawings. The opening and closing of the shutters 44 and 46 through linkage 48 and 50 respectively, may be quite conventional and to this end, there is illustrated an actuator that might well be in the nature of a hydraulic piston and cylinder assembly 52 operably coupled with the shutters 44 and 46 through the linkages 48 and 50 and in direct control of the pilot within cockpit 24. Obviously, if desired, the shutters 44 and 46 may be independently operated through separate power means corresponding thereto.

Additional control may be provided through a tail assembly broadly designated by the numeral 54 and including rudders and elevators in the usual manner. In the event that percent-of-power is insufficient to provide directional stability, the exhaust gases emanating from the jet engines may be bled past the rudders whereby the same positively respond to deflection from conventional flight controls and thereby control direction with a resultant high maneuverability.

With the shutters 44 and 46 open and the deflectors 38 properly positioned, it is possible to cause the plane to take off substantially vertically through the thrust provided by the rotary propellers 14 and 16. It is contemplated however, that such vertical thrusts be correlated with forward thrust provided essentially from the engines 34 and 36, and, therefore, in FIG. 5 of the drawings, there is illustrated diagrammatically one adjustment that will provide upward and forward movement in the direction of arrow 56.

The forward thrust afforded by engines 34 and 36 is illustrated by the arrow 58 and the vertical thrust or lift from the contra-rotating propellers 14 and 16 is indicated by the numeral 60. Manifestly, therefore, the combination of these two thrusts produces the resulting force for lifting the aircraft as indicated by the numeral 56. Additional lift may be produced by proper positioning of the shutters 44 and 46 and for vertical ascent and descent such shutters or vanes are adjusted to allow a mass of air to be forced downwardly through the tube 12 to the end that the airfoil-shaped vanes 44 create the added lift whereas vanes 46 cause the air mass to be deflected downwardly and rearwardly. Such correlation of the vertical thrust as indicated by the numeral 62 of FIG. 6 with the forward thrust as indicated by arrow 64, provides a greater resultant force as illustrated by arrow 66 in FIG. 6.

Once altitude is obtained, a smooth conversion to horizontal flight may be attained by closing the shutters 44 and 46 as horizontal speed progressively increases. At this time the two inboard turbo-propeller units 26 and 28 are shut down and flight is sustained by the outboard turbojet units 34 and 36.

It can be seen, therefore, that by proper application of the two forces aforementioned, and by control of the attitude of the airplane, the pilot can easily control vertical ascent or descent as well as maneuver the plane fore-and-aft. It is manifest that such movements may be produced regardless of the plane's attitude and, therefore, while a conventional tricycle landing gear arrangement is illustrated, modifications therein may be made to facilitate attaining an advantageous attitude prior to take-off and at the time of vertical or substantially vertical landings.

Having thus described the invention what is claimed as new and desired to be secured by Letters Patent is:

1. In an airplane, a pan-cake type fuselage of aerodynamic configuration in the direction of normal forward movement of the airplane and having length and width dimensions of the same approximate order of magnitude and a thickness of greatest order at a substantially central part of the fuselage and of substantially lesser magnitude than said length and width dimensions thereof, said fuselage being provided with a substantially vertical, generally cylindrical air duct therethrough at the thickest portion of the same; air foil means mounted in the duct and including vertically spaced, variable pitch propeller means mounted for rotation about a fixed, normally vertical axis; separately controllable, turbo-propulsion means fixedly mounted on opposite side margins of the fuselage and each having generally rearwardly facing exhaust means disposed with the axes thereof in substantially parallel relationship with said normal direction of forward movement of the airplane; means operably coupling said turbo-propulsion means to said propeller means for rotating the same during operation of said turbo-propulsion means; separately controllable jet propulsion means mounted on opposite side margins of the fuselage adjacent respective turbo-propulsion means and each having generally rearwardly facing exhaust means disposed with the axes thereof in generally parallel relationship with the axes of the exhaust means of said turbo-propulsion means, said jet propulsion means providing a forward thrust component upon the fuselage during operation thereof; and shiftable control surface means including a deflector within each of said exhaust means of the turbo-propulsion means and said jet propulsion means, the deflectors in the exhaust means on one side margin of the fuselage being independently shiftable relative to the deflectors in the exhaust means on the other side margin of the fuselage, said deflectors being swingable about corresponding, normally horizontal axes and disposed to impart stability to motion of the fuselage by deflection in either vertical direction of exhaust gases from said turbo-propulsion means and said jet propulsion means to control pitch and roll of the fuselage regardless of whether said turbo-propulsion means or said jet propulsion means are operating separately or in conjunction.

2. An airplane as set forth in claim 1 wherein is provided air flow control means including a plurality of first shiftable shutters in the duct across the lower extremity of the latter and below said air foil means for deflecting air emanating from the duct downwardly and rearwardly to correlate the forward thrust of said jet propulsion means and the upward thrust of said air foil means and wherein is provided a plurality of second shiftable shutters in the duct across the upper extremity of the latter above said air foil means and disposed for increasing the lift upon the fuselage during forward movement of the latter.

References Cited in the file of this patent

UNITED STATES PATENTS

| | | |
|---|---|---|
| 1,449,100 | Hall | Mar. 20, 1923 |
| 1,781,910 | Anker-Holth | Nov. 18, 1930 |
| 1,801,725 | Cook | Apr. 21, 1931 |
| 2,118,052 | Odor | May 24, 1938 |
| 2,381,596 | Jensen | Aug. 7, 1945 |
| 2,407,414 | Gillmore et al. | Sept. 10, 1946 |
| 2,461,435 | Neumann et al. | Feb. 8, 1949 |
| 2,507,657 | Wiessler | May 16, 1950 |
| 2,567,392 | Naught | Sept. 11, 1951 |
| 2,693,079 | Rau | Nov. 2, 1954 |
| 2,711,295 | Peterson | June 21, 1955 |
| 2,718,364 | Crabtree | Sept. 20, 1955 |
| 2,730,311 | Doak | Jan. 10, 1956 |
| 2,734,698 | Straayer | Feb. 14, 1956 |
| 2,762,584 | Price | Sept. 11, 1956 |
| 2,843,338 | Streib | July 15, 1958 |

FOREIGN PATENTS

| | | |
|---|---|---|
| 735,106 | Great Britain | Aug. 17, 1955 |